United States Patent
Nagata et al.

(10) Patent No.: US 12,362,104 B2
(45) Date of Patent: Jul. 15, 2025

(54) CAPACITOR

(71) Applicant: Murata Manufacturing Co., Ltd., Nagaokakyo (JP)

(72) Inventors: Masaki Nagata, Nagaokakyo (JP); Yasuhiro Shimizu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 295 days.

(21) Appl. No.: 18/298,610

(22) Filed: Apr. 11, 2023

(65) Prior Publication Data

US 2023/0245837 A1    Aug. 3, 2023

Related U.S. Application Data

(63) Continuation of application No. PCT/JP2021/042212, filed on Nov. 17, 2021.

(30) Foreign Application Priority Data

Nov. 27, 2020  (JP) .................................. 2020-197327

(51) Int. Cl.
H01G 9/032    (2006.01)
H01G 4/33     (2006.01)
H01G 9/15     (2006.01)

(52) U.S. Cl.
CPC ............... *H01G 9/032* (2013.01); *H01G 4/33* (2013.01); *H01G 9/153* (2013.01)

(58) Field of Classification Search
CPC ............ H01G 9/032; H01G 4/33; H01G 9/153
See application file for complete search history.

(56) References Cited

U.S. PATENT DOCUMENTS

| | | |
|---|---|---|
| 2005/0128685 A1 | 6/2005 | Hasegawa |
| 2005/0219788 A1 | 10/2005 | Chow et al. |
| 2006/0214262 A1 | 9/2006 | Mosley et al. |

(Continued)

FOREIGN PATENT DOCUMENTS

| | | |
|---|---|---|
| JP | 2004127737 A | 4/2004 |
| JP | 2005093749 A | 4/2005 |

(Continued)

OTHER PUBLICATIONS

International Search Report in PCT/JP2021/042212, mailed Feb. 15, 2022, 3 pages.

*Primary Examiner* — David M Sinclair
*Assistant Examiner* — Kaemon Eli Watada
(74) *Attorney, Agent, or Firm* — ArentFox Schiff LLP

(57) ABSTRACT

A capacitor that includes: a base material having: a substrate; a first conductive portion on at least one main surface of the substrate; and an insulating-resin layer on a surface of the first conductive portion; a plurality of fibrous conductive cores, a first end portion of each of the plurality of the fibrous conductive cores being in contact with the first conductive portion through the insulating-resin layer; a dielectric layer covering a portion of the plurality of the fibrous conductive cores exposed from the base material; a conductive polymer layer covering the dielectric layer such that gaps are provided in spaces between the plurality of the fibrous conductive cores; and a second conductive portion in contact with the conductive polymer layer at a second end portion of the plurality of the fibrous conductive cores.

12 Claims, 5 Drawing Sheets

(56) References Cited

U.S. PATENT DOCUMENTS

| | | |
|---|---|---|
| 2010/0181646 A1 | 7/2010 | Yoo |
| 2011/0045349 A1 | 2/2011 | Pushparaj et al. |
| 2011/0080686 A1* | 4/2011 | Farcy ............... H01G 4/008 |
| | | 29/25.41 |
| 2022/0013305 A1* | 1/2022 | Desmaris ............ H01M 50/11 |

FOREIGN PATENT DOCUMENTS

| | | |
|---|---|---|
| JP | 2009071003 A | 4/2009 |
| JP | 2011165794 A | 8/2011 |
| WO | 2004070750 A1 | 8/2004 |
| WO | 2020080993 A1 | 4/2020 |

\* cited by examiner

CAPACITOR

CROSS REFERENCE TO RELATED APPLICATIONS

The present application is a continuation of International application No. PCT/JP2021/042212, filed Nov. 17, 2021, which claims priority to Japanese Patent Application No. 2020-197327, filed Nov. 27, 2020, the entire contents of each of which are incorporated herein by reference.

FIELD OF THE INVENTION

The present invention relates to a capacitor and, more particularly, to a capacitor having a conductor-dielectric-conductor structure.

BACKGROUND OF THE INVENTION

It is conventionally known that vertically aligned carbon nanotubes (hereinafter, also referred to as "VACNTs") can be used in an electric double layer capacitor or the like (for example, see Patent Document 1).

More specifically, Patent Document 1 discloses that after VACNTs are grown on a synthetic substrate to which a catalyst is deposited, the VACNTs on the synthetic substrate are pressed against and adhered to a conductive layer of a separately prepared base material having the conductive layer (conductive adhesive layer) and the synthetic substrate is peeled off the base material to transfer the VACNTs, and thus, it is possible to manufacture a structure in which the VACNTs are fixed to the base material via the conductive layer.

On the other hand, a solid electrolytic capacitor is known (for example, see Patent Document 2). The solid electrolytic capacitor has a dielectric layer on one electrode having a large specific surface area, and the space between the dielectric layer and the other electrode is filled with a solid electrolyte.

Patent Document 1: Japanese Patent Application Laid-Open No. 2004-127737
Patent Document 2: WO 2004/070750 A

SUMMARY OF THE INVENTION

VACNT is a conductor having a large specific surface area. Therefore, it is considered that a large capacitance can be obtained by using such VACNTs as one conductor in a capacitor having a conductor-dielectric-conductor structure and sequentially covering a portion of the VACNTs exposed from the conductive layer of the base material and a surface region of the conductive layer of the base material where the VACNTs are exposed with a dielectric layer and a conductive polymer layer. However, studies by the present inventors have revealed that when a capacitor is manufactured in this manner, a crack may occur in the dielectric layer between the conductive layer of the base material and the conductive polymer layer due to a thermal stress applied during use by a user, and a short circuit may occur between the conductive layer of the base material and the conductive polymer layer via the crack, resulting in a problem that high reliability cannot be obtained (more details will be described later with reference to FIGS. 5(a) and 5(b)).

The above-described phenomenon is not limited to VACNTs, and may occur commonly in a capacitor in which a portion of a plurality of fibrous conductive cores exposed from a conductive layer of a base material and a surface region of the conductive layer of the base material where the plurality of the fibrous conductive cores are exposed are sequentially covered with a dielectric layer and a conductive polymer layer.

An object of the present invention is to provide a highly reliable capacitor including a plurality of fibrous conductive cores.

According to one gist of the present invention, there is provided a capacitor including: a base material having: a substrate; a first conductive portion on at least one main surface of the substrate; and an insulating-resin layer on a surface of the first conductive portion opposite to the substrate; a plurality of fibrous conductive cores, a first end portion of each of the plurality of the fibrous conductive cores being in contact with the first conductive portion through the insulating-resin layer and a second end portion of each of the plurality of the fibrous conductive cores being exposed from the base material; a dielectric layer covering a portion of the plurality of the fibrous conductive cores exposed from the base material and a surface region of the base material where the plurality of the fibrous conductive cores are exposed; a conductive polymer layer covering the dielectric layer such that gaps are provided in spaces between at least some of the plurality of the fibrous conductive cores; and a second conductive portion arranged in contact with the conductive polymer layer at the second end portion of each of the plurality of the fibrous conductive cores.

In one aspect of the present invention, the insulating-resin layer may contain a thermoplastic resin.

In one aspect of the present invention, an absolute value of a difference in a linear expansion coefficient between the dielectric layer and the substrate may be $1\times10^{-7}$/K or more, a Young's modulus of the substrate may be 10 GPa or more, and a ratio of a thickness of the substrate to a thickness of the dielectric layer may be 100 or more.

In one aspect of the present invention, the dielectric layer may be composed of at least one selected from a group consisting of aluminum oxide, silicon oxide, barium titanate, silicon nitride, and hafnium oxide.

In one aspect of the present invention, the substrate may be composed of at least one selected from a group consisting of silicon, copper, aluminum, and nickel.

In one aspect of the present invention, each of the plurality of the fibrous conductive cores may be a conductive nanotube or a conductive nanorod, and may preferably be a carbon nanotube.

The capacitor of the present invention is characterized by containing a plurality of fibrous conductive cores and using a base material having a first conductive portion on at least one main surface of a substrate and having an insulating-resin layer on a front surface of the first conductive portion. Due to such a characteristic, while the portion of the plurality of the fibrous conductive cores exposed from the base material and the surface region of the base material where the plurality of the fibrous conductive cores are exposed are sequentially covered with the dielectric layer and the conductive polymer layer and the gaps are provided in the conductive polymer layer among the plurality of the fibrous conductive cores, it is still possible to effectively prevent occurrence of a short circuit. That is, according to the present invention, a highly reliable capacitor including a plurality of fibrous conductive cores is realized.

DETAILED DESCRIPTION OF THE INVENTION

Capacitors according to two embodiments of the present invention will be described in detail below with reference to the drawings, but the present invention is not limited to these embodiments.

First Embodiment

The present embodiment relates to an aspect in which a plurality of fibrous conductive cores are aligned perpendicular to a base material.

Figure 1:
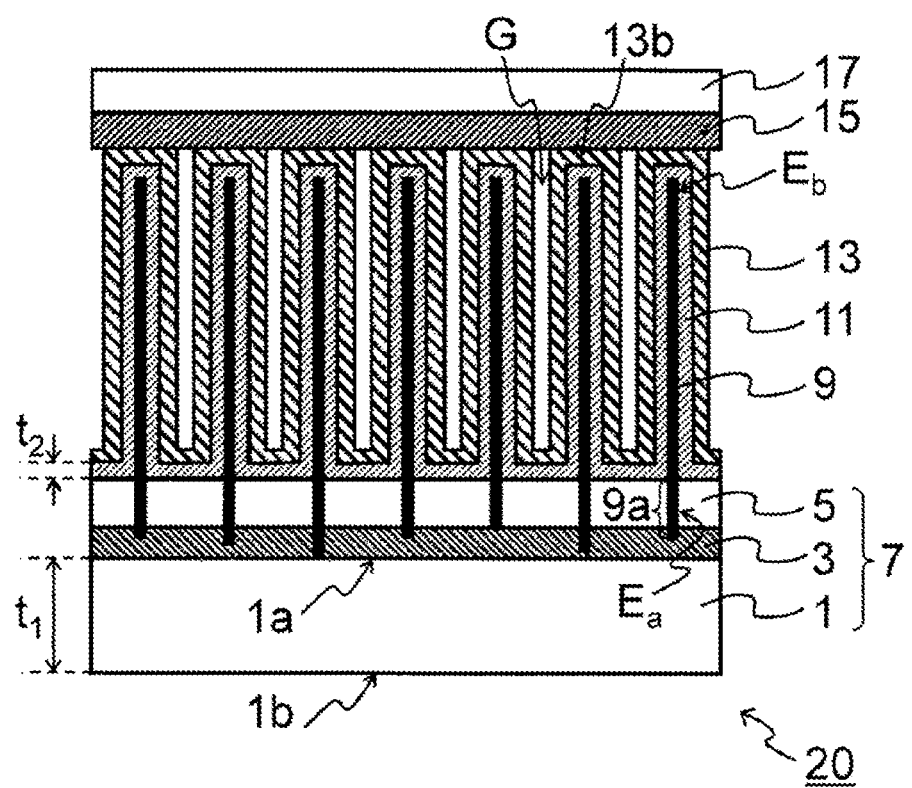
FIG. 1 shows a schematic sectional view of one exemplary capacitor according to one embodiment of the present invention.

Referring to FIG. 1, a capacitor 20 of the present embodiment includes: a base material 7 having a first conductive portion 3 on at least one main surface 1a of a substrate 1 which has two main surfaces 1a (front surface) and 1b (back surface) opposed to each other, and having an insulating-resin layer 5 on a front surface of the first conductive portion 3; a plurality of fibrous conductive cores 9, with one end portion $E_a$ of each of the plurality of the fibrous conductive cores 9 being in contact with the first conductive portion 3 through the insulating-resin layer 5 and the other end portion of each of the fibrous conductive cores 9 being exposed from the base material 7; a dielectric layer 11 covering a portion of the fibrous conductive cores 9 exposed from the base material 7 and a surface region of the base material 7 where the fibrous conductive cores 9 are exposed; a conductive polymer layer 13 which covers the dielectric layer 11 and in which gaps G are provided among the fibrous conductive cores 9; and a second conductive portion 15 arranged in contact with a top portion 13b of the conductive polymer layer 13 corresponding to the other end portion $E_b$ of each of the fibrous conductive cores 9. The capacitor 20 of the present embodiment may further include a resin layer 17 that covers the second conductive portion 15 on a side opposite to the conductive polymer layer 13, but the resin layer 17 is not essential to the present invention.

The plurality of fibrous conductive cores 9 have conductivity (typically, they are conductors), and may be at the same potential or voltage as each other via the first conductive portion 3. Therefore, a conductor-dielectric-conductor structure is formed of the fibrous conductive cores 9, the dielectric layer 11 and the conductive polymer layer 13. Such a conductor-dielectric-conductor structure can be understood as corresponding to a so-called metal-insulator-metal structure (MIM structure). The capacitor 20 having such a structure can obtain a large capacitance due to the large specific surface area of the fibrous conductive cores 9. Without limiting the present embodiment, the fibrous conductive cores 9 may be used as an anode and the conductive polymer layer 13 may be used as a cathode.

In the capacitor 20, gaps G are provided among the fibrous conductive cores 9 in the conductive polymer layer 13. In the aspect exemplarily shown in FIG. 1, the gaps G may correspond to spaces among the fibrous conductive cores 9. The gaps G may be left corresponding to the spaces among the fibrous conductive cores 9 by sequentially covering the portion of the fibrous conductive cores 9 exposed from the base material 7 (in other words, the portion of the fibrous conductive cores 9 excluding a base material-embedded portion 9a, in the present embodiment, the portion of the fibrous conductive cores 9 exposed from the insulating-resin layer 5 on the side opposite to the first conductive portion 3) and the surface region of the base material 7 where the fibrous conductive cores 9 are exposed (in the present embodiment, the surface region of the insulating-resin layer 5 on the side opposite to the first conductive portion 3) with the dielectric layer 11 and the conductive polymer layer 13. However, the present embodiment is not limited thereto, and it is sufficient that the conductive polymer layer 13 is provided with the gaps G among the fibrous conductive cores 9.

The capacitor 20 of the present embodiment is characterized by using the base material 7 having the first conductive portion 3 on the main surface 1a of the substrate 1 and having the insulating-resin layer 5 on the front surface of the first conductive portion 3. According to the present embodiment, due to such a characteristic, while the portion of the fibrous conductive cores 9 exposed from the base material 7 and the surface region of the base material 7 where the fibrous conductive cores 9 are exposed are sequentially covered with the dielectric layer 11 and the conductive polymer layer 13 and the gaps G are provided in the conductive polymer layer 13 among the fibrous conductive cores 9, it is still possible to effectively prevent occurrence of a short circuit due to a thermal stress that may be applied during use by a user.

Figure 5:
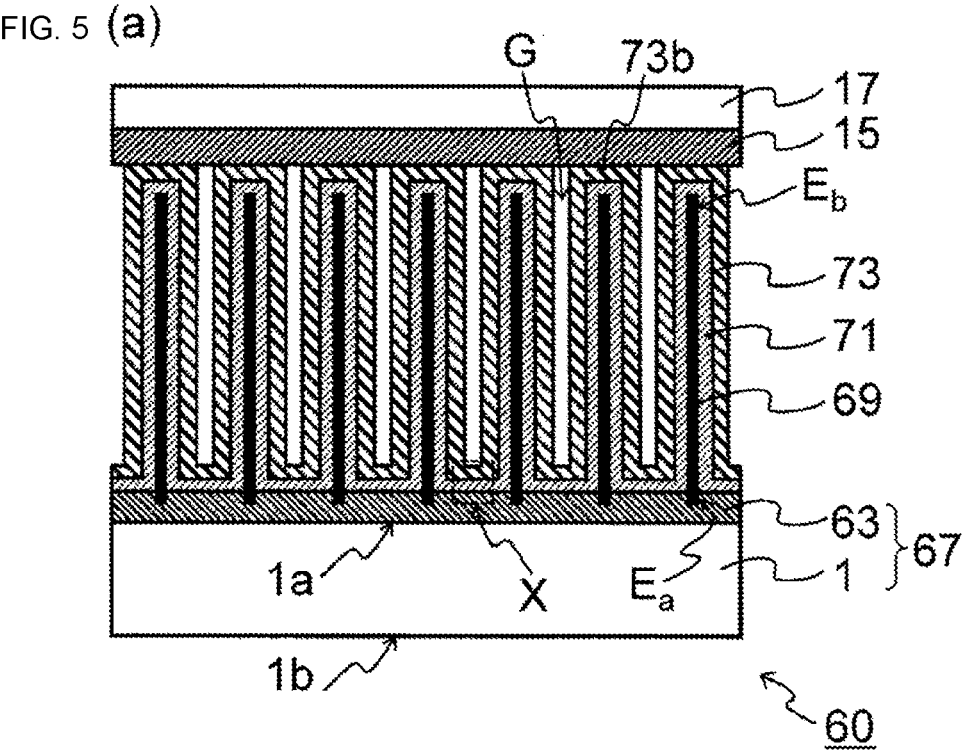
FIG. 5(a) shows a schematic sectional view of one exemplary capacitor described in the present description for purposes of comparison to the present invention.
FIG. 5(b) shows an enlarged view of a region X indicated by the dotted lines in FIG. 5(a).
Figure 5:
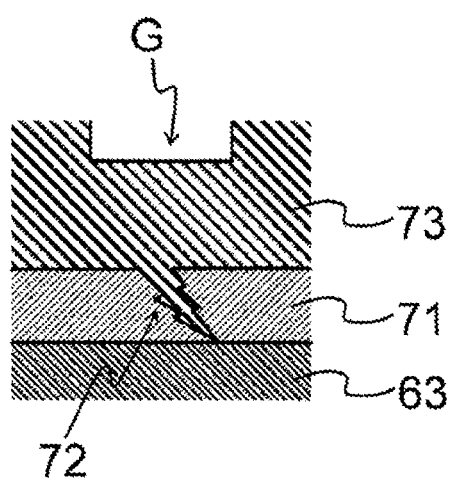

For the purpose of comparison, FIGS. 5(a) and 5(b) show a capacitor 60 in which a base material 67 having a first conductive portion 63 formed on the main surface 1a of the substrate 1 is used and a portion of fibrous conductive cores 69 exposed from the first conductive portion 63 of the base material and a surface region where the fibrous conductive cores 69 are exposed of the first conductive portion 63 of the base material 67 are sequentially covered with a dielectric layer 71 and a conductive polymer layer 73. The capacitor 60 can be manufactured by applying a conventionally known method as described in, for example, Patent Document 1, and similarly to the capacitor 20 of the present embodiment, the second conductivity 15 of the capacitor 60 is disposed in contact with a top portion 73b of the conductive polymer layer 73, and the second conductive portion 15 is covered with the resin layer 17. In the capacitor 60, a crack 72 may occur in the dielectric layer 71 between the first conductive portion 63 of the base material 67 and the conductive polymer layer 73 due to a thermal stress that may be applied during use by a user, and a short circuit may occur between the first conductive portion 63 of the base material 67 and the conductive polymer layer 73 via the crack 72.

As a result of research by the present inventors, it has been found that the above-described problem is peculiar to the case where the portion of the fibrous conductive cores 69 exposed from the first conductive portion 63 of the base material 67 and the surface region where the fibrous conductive cores 69 are exposed of the first conductive portion 63 of the base material 67 are sequentially covered with the dielectric layer 71 and the conductive polymer layer 73. In this case, when the gaps G exist in the conductive polymer layer 73 among the fibrous conductive cores 69 and heat is supplied from the outside and/or heat is generated by energization of the capacitor 60 during use by a user in such a state, it is considered that the crack 72 is likely to occur in a portion of the dielectric layer 71 located at the bottom of the gaps G of the conductive polymer layer 73 (a portion located between the first conductive portion 63 of the base material 67 and the conductive polymer layer 73) due to a thermal stress caused by a difference in a linear expansion coefficient between the dielectric layer 71 and the substrate 67 (in some cases, a conductive polymer enters the crack 72 from the conductive polymer layer 73 and comes into contact with the first conductive portion 63 of the base material 67) and a short circuit may occur between the first conductive portion 63 of the base material 67 and the conductive polymer layer 73. This finding has been uniquely obtained by the present inventors.

In a conventionally known solid electrolytic capacitor as described in Patent Document 2, a space between a dielectric layer (oxide film) formed on one electrode (valve action metal layer) having a large specific surface area and the other electrode is filled with a solid electrolyte, and there is no gap. It is considered that when there is no gap, no thermal stress is limitedly applied to a specific portion of the dielectric layer, and thus a crack is less likely to occur in the dielectric layer.

In contrast, in the capacitor 20 of the present embodiment (see FIG. 1), the dielectric layer 11 is not in direct contact with the first conductive portion 3 due to the above-described characteristic, and therefore, in this state, during use by a user, heat is supplied from the outside and/or heat is generated by energization of the capacitor, and a thermal stress is applied to the portion of the dielectric layer 11 located at the bottom of the gaps G in the conductive polymer layer 13 (the portion located between the insulating-resin layer 5 of the base material 7 and the conductive polymer layer 13), and if a crack occurs, the presence of the insulating-resin layer 5 can effectively reduce the occurrence of a short circuit between the first conductive portion 3 of the base material 7 (the substrate 1 if the substrate 1 is composed of a conductive material, the same applies hereinafter) and the conductive polymer layer 13. In addition, due to the presence of the insulating-resin layer 5, the thermal stress applied to the portion of the dielectric layer 11 (the portion located between the insulating-resin layer 5 of the base material 7 and the conductive polymer layer 13) can be relaxed, and the occurrence of a crack itself can be reduced. In other words, the capacitor 20 having high reliability can be realized.

In the present embodiment, the plurality of the fibrous conductive cores 9 are aligned such that the longitudinal direction thereof (more specifically, the longitudinal direction of the portion of the plurality of the fibrous conductive cores 9 excluding the base material-embedded portion 9a) is perpendicular to the base material 7. "Perpendicular" refers to being substantially perpendicular (for example, within a range of ±15 degrees, preferably within a range of ±10 degrees) to the front surface (so-called main surface) of the base material 7. It should be noted that not all of the fibrous conductive cores 9 in the capacitor need be perpendicular to the front surface of the base material 7, and a relatively small proportion of the fibrous conductive cores 9 may be curved, bent and/or inclined.

The fibrous conductive cores 9 (each of the plurality of the fibrous conductive cores 9) are not particularly limited as long as the longitudinal direction dimension (length) thereof is (preferably remarkably) larger than the maximum sectional dimension perpendicular to the longitudinal direction, that is, each of the fibrous conductive cores 9 is generally in the form of an elongated thread.

It is preferable that the length of the fibrous conductive cores 9 is longer because the capacitance density per area can be increased. The length of the fibrous conductive cores 9 may be, for example, several μm or more, 20 μm or more, 50 μm or more, 100 μm or more, 500 μm or more, 750 μm or more, 1000 μm or more, or 2000 μm or more. The upper limit of the length of the fibrous conductive cores 9 can be appropriately selected, and the length of the fibrous conductive cores 9 can be, for example, 10 mm or less, 5 mm or less, or 3 mm or less.

The maximum sectional dimension of the fibrous conductive cores 9 may be, for example, 0.1 nm or more, 1 nm or more, or 10 nm or more. The maximum sectional dimension of the fibrous conductive cores 9 may be, for example, 1 nm or more, or 10 nm or more. The maximum sectional dimension of the fibrous conductive cores 9 may be less than 1000 nm, 800 nm or less, or 600 nm or less.

It is preferable that the distance between the adjacent fibrous conductive cores 9 is smaller because the capacitance density per area can be increased. The distance between the adjacent fibrous conductive cores 9 can be, for example, 10 nm to 1 μm.

It is preferable that the fibrous conductive cores 3 are conductive nanofibers (having a maximum sectional dimension of nanoscale (1 nm to 1000 nm)). The conductive nanofibers may be, for example, conductive nanotubes (hollow, preferably cylindrical) or conductive nanorods (solid, preferably columnar). A conductive (including semiconductive) nanorod is also referred to as a nanowire.

The conductive nanofibers usable in the present invention are not particularly limited, and examples thereof include carbon nanofibers. The conductive nanotubes usable in the present invention are not particularly limited, and examples thereof include metal-based nanotubes, organic conductive nanotubes, and inorganic conductive nanotubes. Typically, the conductive nanotubes may be carbon nanotubes or titania carbon nanotubes. The conductive nanorods (nanowires) usable in the present invention are not particularly limited, and examples thereof include silicon nanowires and silver nanowires.

It is preferable that the fibrous conductive cores 9 are carbon nanotubes. Carbon nanotubes have electrical conductivity and thermal conductivity. Carbon nanotubes have high strength and flexibility and are likely to maintain a vertically aligned state.

Chirality of the carbon nanotube is not particularly limited, and either a semiconductor type or a metal type, or a mixture thereof may be used. From the viewpoint of reducing the resistance value, it is preferable that the ratio of the metal type is high.

The number of layers of the carbon nanotube is not particularly limited, and the carbon nanotube may be either a single-walled carbon nanotube (SWCNT) having one layer or a multi-walled carbon nanotube (MWCNT) having two or more layers.

It is preferable that the plurality of fibrous conductive cores 3 are vertically aligned carbon nanotubes (VACNT). The VACNT has the advantages that the VACNT has a large specific surface area and can be manufactured by being grown on a synthetic substrate in a vertically aligned state as described below.

The one end portion $E_a$ of each of the fibrous conductive cores 9 is embedded in the base material 7, and more specifically, passes through (penetrates) the insulating-resin layer 5 and is in contact with the first conductive portion 3. The one end portion $E_a$ of each of the fibrous conductive cores 9 may be in contact (surface contact) with the first conductive portion 3 or may be partly embedded in the first conductive portion 3. The lengths of the base material-embedded portions 9a of the plurality of the fibrous conductive cores 9 may be substantially the same or different from each other (long ones and short ones may be mixed). Although seven of the fibrous conductive cores 9 are schematically shown in the accompanying drawings, the present embodiment is not limited thereto.

The base material 7 includes the first conductive portion 3 and the insulating-resin layer 5 in this order on the main surface 1a of the substrate 1. It may be understood that the base material 7 includes the substrate 1 having the first conductive portion 3 and the insulating-resin layer 5 disposed on the first conductive portion 3 of the substrate 1.

The substrate 1 has two main surfaces 1a (front surface) and 1b (back surface) facing each other, and may be in the form of, for example, a plate (substrate), foil, film, block, etc.

The material constituting the substrate 1 may be appropriately selected, and may be, for example, a semiconductor material such as silicon, a conductive material such as a metal (copper, aluminum, or nickel), or an insulating (or relatively poorly conductive) material such as a ceramic (silicon oxide) or a resin. The substrate 1 may be composed of one kind of material, composed of a mixture of two or more kinds of materials, or may be a composite composed of two or more kinds of materials.

The thickness $t_1$ of the substrate 1 is not particularly limited and may vary depending on the use of the capacitor 20.

Although the present embodiment is not limited thereto, the Young's modulus $E_1$, the linear expansion coefficient $\alpha_1$, and the thickness $t_1$ of the substrate 1 may typically be as follows.

Young's modulus $E_1$: about 100 GPa
Linear expansion coefficient $\alpha_1$: about $5 \times 10^{-6}$/K
Thickness $t_1$: 100 μm or more At least the outermost surface (the surface in contact with the insulating-resin layer 5) of the first conductive portion 3 should be conductive. For example, the first conductive portion 3 may have a form of layer, and may typically be a metal layer (which may be a single layer or a laminated body). The metal layer may be composed of at least one (elemental metal or alloy) selected from a group consisting of titanium, gold, silver, copper, aluminum, nickel, etc. In addition, for example, the first conductive portion 3 may be an arbitrary laminated body in which the outermost surface of the first conductive portion 3 is composed of a metal layer and other layers are included in addition to the outermost surface of the first conductive portion 3. The other layers may be composed of, for example, a ceramic such as a metal oxide or silicon oxide. The metal layer and the other layers, if present, may be layers that extend over the whole surface or may be patterned.

The thickness of the first conductive portion 3 is significantly smaller than the thickness of the substrate 1. The thickness of the first conductive portion 3 may be, for example, 1 μm or less, particularly 500 nm or less. The lower limit of the thickness of the first conductive portion 3 may be appropriately selected, and the thickness of the first conductive portion 3 may be, for example, 100 nm or more. When the first conductive portion 3 is provided on the substrate 1 with a thickness in such a range, by forming the first conductive portion 3 (more specifically, at least the outermost surface thereof) of a metal that can be softened at a lower temperature than the substrate 1 (for example, by forming a metal layer), the metal of the first conductive portion 3 can be softened at a relatively low temperature during the transfer of the fibrous conductive cores 9 to be described later, and thus, a better (electrical and physical) connection is obtained between the fibrous conductive cores 9 and the first conductive portion 3 without substantially causing oxidation of the fibrous conductive cores 9.

However, when the substrate 1 is composed of a conductive material, the substrate 1 and the first conductive portion 3 may be composed of conductive materials different from each other or may be integrally composed of the same conductive material (for example, metal). When the substrate 1 is composed of a conductive material different from the conductive material constituting the first conductive portion 3, the substrate 1 may also serve the same function as the first conductive portion 3, and the plurality of fibrous conductive cores 9 may be at the same potential or voltage as each other via the substrate 1 and/or the first conductive portion 3. When the substrate 1 is composed of the same conductive material as the conductive material constituting the first conductive portion 3 and the substrate 1 and the first conductive portion 3 are integrally constituted, the boundary between the substrate 1 and the first conductive portion 3 (in other words, the main surface (front surface) 1a of the substrate 1) cannot be clearly recognized, and thus, the substrate 1 and the first conductive portion 3 may be understood as the whole member integrally constituted of the same conductive material. (Alternatively, a virtual portion on the main surface (back surface) 1b side of the member integrally constituted of the same conductive material may be understood as the substrate 1, and a virtual portion on the side opposite to the main surface (back surface) 1b of the integrally constituted member may be understood as the first conductive portion 3.) In any case, the member integrally constituted of the same conductive material can perform the function of the substrate 1 and the function of the first conductive portion 3, and the plurality of the fibrous conductive cores 9 can be at the same potential or voltage as each other via the member integrally constituted of the same conductive material. In this case, the Young's modulus $E_1$, the linear expansion coefficient $\alpha_1$, and the thickness $t_1$ of the substrate 1 described above are the Young's modulus, the linear expansion coefficient, and the thickness of the member (functioning as the substrate 1) which is integrally constituted of the same conductive material (the thickness of the first conductive layer 3 may be considered to be 0 for convenience).

The insulating-resin layer 5 may be composed of a resin material having insulating properties, and in addition to the insulating resin, the resin material may contain any other appropriate component (in a relatively small amount so as to maintain the insulating properties) in some cases. The resin material (and thus the insulating-resin layer 5) may contain a thermoplastic resin (for example, a polyolefin-based resin such as polyethylene or polypropylene, or a polyamide-based resin) or a thermosetting resin (for example, a phenol-based resin or epoxy glass). For example, what is commonly known as an "insulating adhesive" may be used.

It is preferable that the insulating-resin layer 5 contains a thermoplastic resin. When the insulating-resin layer 5 contains a thermoplastic resin, it is possible to more effectively reduce the occurrence of a short circuit due to a thermal stress that may be applied during use by a user. More specifically, in the case where the insulating-resin layer 5 contains a thermoplastic resin, when heat is supplied from the outside and/or heat is generated by energization of the capacitor 20 during use by a user, the thermoplastic resin of the insulating-resin layer 5 can be plastically deformed by the heat, and a crack is less likely to occur in the insulating-resin layer 5, and thus, if a crack occurs in the portion of the dielectric layer 11 located at the bottom of the gaps G of the conductive polymer layer 13, the occurrence of a short circuit between the first conductive portion 3 of the base material 7 and the conductive polymer layer 13 can be reduced more effectively. The insulating-resin layer 5 may contain the thermoplastic resin in an amount of more than 50% by mass, for example, 60% by mass or more, and may preferably be composed of the thermoplastic resin.

The thickness of the insulating-resin layer 5 may be preferably 1 μm to 100 μm, and more preferably 5 μm to 50 μm.

The dielectric material constituting the dielectric layer 11 may be appropriately selected, and examples thereof include silicon dioxide, aluminum oxide, silicon nitride, tantalum oxide, hafnium oxide, barium titanate, and lead zirconate titanate. One of these may be used alone, or two or more of these may be used in combination (for example, in the form of being laminated).

The thickness $t_2$ of the dielectric layer 11 is preferably 5 nm or more, and more preferably 10 nm or more. By setting the thickness of the dielectric layer to 5 nm or more, the dielectric property can be improved and the leakage current can be reduced. The thickness $t_2$ of the dielectric layer 11 may be, for example, 1 μm or less, preferably 100 nm or less, and more preferably 50 nm or less. By setting the thickness $t_2$ of the dielectric layer 11 to 1 μm or less, a larger electrostatic capacitance can be obtained.

Although the present embodiment is not limited thereto, the Young's modulus $E_2$, the linear expansion coefficient $\alpha_2$, and the thickness $t_2$ of the dielectric layer 11 may typically be as follows.

Young's modulus $E_2$: about 350 GPa
Linear expansion coefficient $\alpha_2$: about $7\times10^{-6}$/K
Thickness $t_2$: 100 nm or less In the capacitor 20 of the present embodiment, the above-described effect that the occurrence of a short circuit between the first conductive portion 3 of the base material 7 and the conductive polymer layer 13 can be effectively reduced by the presence of the insulating-resin layer 5 is particularly effective when a crack is likely to occur in the portion of the dielectric layer 11 located at the bottom of the gaps G of the conductive polymer layer 13.

According to the research of the present inventors, when the substrate 1 and the dielectric layer 11 satisfy all of the following conditions (1) to (3), it is considered that the thermal stress that can be applied to the above portion of the dielectric layer 11 is relatively large and a crack is likely to occur, and thus, the effect of reducing the occurrence of a short circuit due to the presence of the insulating-resin layer 5 is significant.

Conditions:

$$|\alpha_1-\alpha_2|\geq 1\times 10^{-7}/K \quad (1)$$

$$E_1\geq 10 \text{ GPa} \quad (2)$$

$$t_1/t_2\geq 100 \quad (3)$$

These conditions are calculated on the assumption that the temperature of the capacitor 20 used by the user is 100° C. and the dielectric elastic strength of the dielectric layer 11 is 0.12 GPa.

In addition, according to the research of the present inventors, when the substrate 1 and the dielectric layer 11 are composed of, for example, the following materials, it is considered that the thermal stress that can be applied to the above portion of the dielectric layer 11 is relatively large and a crack is likely to occur, and thus, the effect of reducing the occurrence of a short circuit by the presence of the insulating-resin layer 5 is significant.

The substrate 1 is composed of at least one selected from a group consisting of silicon, copper, aluminum, and nickel.

The dielectric layer 11 is composed of at least one selected from a group consisting of aluminum oxide, silicon oxide, barium titanate, silicon nitride, and hafnium oxide.

The conductive polymer layer 13 may be composed of a conductive polymer (a polymer material having conductivity and/or provided with conductivity, and also referred to as an organic conductive material). The conductive polymer is preferable because a crack is less likely to be introduced. Examples of the conductive polymer include polyethylenedioxythiophene (PEDOT), polypyrrole (PPy), and polyaniline (PANI), and these may be appropriately doped with a dopant such as an organic sulfonic acid compound, for example, polyvinylsulfonic acid, polystyrenesulfonic acid, polyallylsulfonic acid, polyacrylsulfonic acid, polymethacrylsulfonic acid, poly-2-acrylamide-2-methylpropanesulfonic acid, or polyisoprenesulfonic acid. Among them, poly (3,4-ethylenedioxythiophene) doped with polystyrene sulfonic acid (PEDOT-PSS) is preferable.

The thickness of the conductive polymer layer 13 may be appropriately selected so that the gaps G remain among the fibrous conductive cores 9. The thickness of the conductive polymer layer 13 may be, for example, 3 nm or more, and preferably 10 nm or more. By setting the thickness of the conductive polymer layer 13 to 3 nm or more, the resistance value of the conductive polymer layer 13 itself can be reduced. The thickness of the conductive polymer layer 13 may be, for example, 500 nm or less, particularly 100 nm or less.

The second conductive portion 15 may have the form of a layer, and may be formed, for example, of a conductive paste. The conductive paste is not particularly limited, and a known conductive paste can be used, for example, the conductive paste may be a carbon paste, a silver paste, or the like.

The resin layer 17 may be an exterior resin that seals an element structure (a conductor-dielectric-conductor structure) of the capacitor 20. The resin layer 17 may be formed of any appropriate resin material. The resin material is not particularly limited, and a known resin material for sealing can be used, for example, the resin material may be a thermosetting epoxy resin in which fine particles such as silica are dispersed.

The thicknesses of the second conductive portion 15 and the resin layer 17 may be appropriately selected as desired.

Although the present embodiment is not limited thereto, the capacitor 20 may be manufactured as follows, for example. Although an exemplary case where the fibrous conductive cores 9 are VACNTs is described below, in the present embodiment, the fibrous conductive cores 9 are not limited to VACNTs, and the capacitor 20 may be manufactured using any appropriate method depending on the fibrous conductive cores 9 to be used.

Preparation of Base Material

First, the substrate 1 having the first conductive portion 3 on the main surface 1a is prepared. The first conductive portion 3 may be, for example, a metal layer (a single layer or a laminated body) as described above, and may include other layers in addition to the outermost surface in some cases. The first conductive portion 3 can be formed using, for example, sputtering, physical vapor deposition (PVD), atomic layer deposition (ALD), coating, or plating.

Next, the insulating-resin layer 5 is formed on the first conductive portion 3. The insulating-resin layer 5 may be formed by applying a resin material having insulating properties onto the first conductive portion 3. The resin material having insulating properties may contain a thermoplastic resin or a thermosetting resin as described above. The coating method is not particularly limited. When the insulating-resin layer 5 contains a thermosetting resin, the thermosetting resin is not fully cured and is in an uncured or semi-cured state at the time.

Thus, the base material 7 having the first conductive portion 3 on the main surface 1a of the substrate 1 and the insulating-resin layer 5 on the front surface of the first conductive portion 3 is prepared.

Preparation of VACNT on Synthetic Substrate

On the other hand, a synthetic substrate for growing VACNTs as the fibrous conductive cores 9 is prepared. The material of the synthetic substrate is not particularly limited, and for example, silicon oxide, silicon, gallium arsenide, aluminum, or SUS can be used.

A catalyst is then deposited on the synthetic substrate. As the catalyst, iron, nickel, platinum, cobalt, an alloy containing these, or the like is used. Methods of depositing the catalyst on the synthetic substrate may include sputtering, PVD, ALD, and the like, and the technique may be combined with techniques such as lithography and etching in some cases.

Then, VACNTs are grown on the synthetic substrate on which the catalyst is deposited. The method of growing VACNTs is not particularly limited, and chemical vapor deposition (CVD), plasma-enhanced CVD, or the like can be used under heating as necessary. The gas to be used is not particularly limited, and for example, at least one selected from a group consisting of carbon monoxide, methane, ethylene and acetylene, or a mixture of at least one of these with hydrogen and/or ammonia can be used. If desired, moisture may be present in the ambient atmosphere during VACNT growth. As a result, VACNTs grow on the synthetic substrate with the catalyst as a nucleus. The ends of the VACNTs on the side of the synthetic substrate on which the catalyst is deposited are fixed ends which are fixed to the synthetic substrate (generally with the catalyst interposed therebetween), and the opposite ends of the VACNTs are free ends which are growth points. The length and diameter of the VACNTs may vary depending on parameters such as gas concentration, gas flow rate, temperature, etc. That is, the length and diameter of the VACNTs can be adjusted by appropriately selecting these parameters.

Although not required in the present embodiment, after the VACNTs are grown, a metal may be deposited on the tips (free ends) of the VACNTs by, for example, sputtering. This makes it possible to obtain a better (electrical and physical) connection between the VACNTs as the fibrous conductive cores 9 and the first conductive portion 3 at the time of VACNT transfer to be described later.

As a result, the VACNTs are prepared on the synthetic substrate.

Transfer of VACNTs to Base Material

The VACNTs prepared on the synthetic substrate are transferred to the base material 7 prepared above. The transfer method is not particularly limited, and is carried out, for example, as follows.

When the insulating-resin layer 5 contains a thermoplastic resin, the base material 7 is heated to soften the thermoplastic resin of the insulating-resin layer 5 (and the metal of the first conductive portion 3 in some cases). Then, in a state where the insulating-resin layer 5 of the base material 7 and the free ends of the VACNTs are opposed to each other, the synthetic substrate with the VACNTs is pressed against the base material 7, and the VACNTs are stuck into the base material 7. At this time, one end portion (free end) $E_a$ of each VACNT as the fibrous conductive core 9 penetrates the insulating-resin layer 5 and comes into contact with (abuts on/is embedded in) the first conductive portion 3. With the VACNTs stuck into the base material 7 in this manner, the base material 7 is cooled to solidify the thermoplastic resin of the insulating-resin layer 5, thereby fixing the VACNTs to the base material 7. Thereafter, the synthetic substrate attached to the other end portion $E_b$ (fixed end) of each VACNT as the fibrous conductive core 9 is removed. It is preferable that when the insulating-resin layer 5 contains a thermoplastic resin, the one end portion $E_a$ of each VACNT as the fibrous conductive core 9 is partly embedded in the first conductive portion 3.

Alternatively, when the insulating-resin layer 5 contains a thermosetting resin (which is uncured or semi-cured at the time), the synthetic substrate with the VACNTs is pressed against the base material 7 and the VACNTs are stuck into the base material 7 in a state where the insulating-resin layer 5 of the base material 7 and the free ends of the VACNTs are opposed to each other. At this time, one end portion (free end) $E_a$ of each VACNT as the fibrous conductive core 9 penetrates the insulating-resin layer 5 and comes into contact with (abuts on/is embedded in) the first conductive portion 3. With the VACNTs stuck into the base material 7 in this manner, the base material 7 is heated to cure the thermosetting resin of the insulating-resin layer 5, thereby fixing the VACNTs to the base material 7. Thereafter, the synthetic substrate attached to the other end portion $E_b$ (fixed end) of each VACNT as the fibrous conductive core 9 is removed.

As a result, one end portion $E_a$ of each VACNT as the fibrous conductive core 9 is embedded in the base material 7, and a structure in which the fibrous conductive cores 9 are fixed to the base material 7 is obtained. In this structure, the height of the other end portion $E_b$ of each of the plurality of the fibrous conductive cores 9 (for example, the height from the front surface of the base material 7) may be substantially uniform (because the end portions $E_b$ are the fixed ends located on the same surface of the synthetic substrate).

From Formation of Element Structure to Completion of Capacitor

The dielectric layer 11 and the conductive polymer layer are sequentially formed on the front surface of the structure prepared above on the side where the fibrous conductive cores 9 are exposed. It is necessary to form the dielectric layer 11 and the conductive polymer layer 13 so that the gaps G finally remain in the conductive polymer layer 13 among the fibrous conductive cores 9.

More specifically, first, the portion of the fibrous conductive cores 9 exposed from the base material 7 and the surface region of the base material 7 where the fibrous conductive cores 9 are exposed (that is, the exposed surface of the insulating-resin layer 5) are covered with the dielectric layer 11. At this time, the dielectric layer 11 is formed so as to continuously cover the portion of the fibrous conductive cores 9 exposed from the base material 7 and the surface region of the base material 7 where the fibrous conductive cores 9 are exposed (that is, the exposed surface of the insulating-resin layer 5) and to have a first trench structure corresponding to the spaces among the fibrous conductive cores 9.

The dielectric layer 11 may be composed of a dielectric material as described above. The film forming method of the dielectric layer 11 is not particularly limited, and ALD, sputtering, CVD, PVD, a sol-gel method, a film forming method using a supercritical fluid, or the like can be used. When the dielectric layer 11 is composed of a metal oxide, a method combining plating and surface oxidation treatment may be used (a metal layer may or may not remain between the fibrous conductive cores 9 and the dielectric layer 11).

Next, the dielectric layer 11 formed as described above is covered with the conductive polymer layer 13. At this time, the conductive polymer layer 13 continuously covers the dielectric layer 11 and may have a second trench structure corresponding to the first trench structure of the dielectric layer 11, thereby forming the conductive polymer layer 13 in a manner of having the gaps G among the fibrous conductive cores 9.

As described above, the conductive polymer layer 13 may be composed of a conductive polymer. As the film forming method of the conductive polymer layer 13, for example, a method can be used in which a dispersion liquid or a solution in which a conductive polymer is dispersed or dissolved in any appropriate solvent is applied onto the dielectric layer 11, and the solvent is vaporized and removed. The method of applying the dispersion liquid (or solution, the same applies hereinafter) onto the dielectric layer 11 may be any appropriate method as long as the dispersion liquid can be impregnated into the first trench structure of the dielectric layer 11, and for example, dipping, spraying, or spin coating can be used. The method of vaporizing the solvent may be evaporation or volatilization by heating. When the solvent is removed, the gaps G remain in the conductive polymer layer 13 among the fibrous conductive cores 9.

The fibrous conductive cores 9 have a large specific surface area (for example, as compared with the valve action metal layer which is one electrode according to Patent Document 2), and the spaces among the fibrous conductive cores 9 and thus the first trench structure of the dielectric layer 11 are narrow and deep (for example, as compared with the unevenness of the dielectric layer formed on the valve action metal layer according to Patent Document 2), and thus, it is necessary to reduce the viscosity of the dispersion liquid applied onto the dielectric layer 11, and therefore a dispersion liquid having a low conductive polymer concentration (a high solvent ratio) is used. When such dispersion liquid is used, the conductive polymer layer 13 which is formed after removing the solvent is very thin, and as a result, the gaps G remain.

If no gaps exist in the conductive polymer layer and the conductive polymer layer is formed to extend in a manner of filling the first trench structure of the dielectric layer, a portion where a thermal stress is likely to be applied, in other words, a portion where a crack is likely to occur of the dielectric layer is not only a portion of the dielectric layer between the first conductive portion of the base material and the conductive polymer layer, which is not desirable. (In this case, it is considered that in the vicinity of the boundary between the conductive polymer layer and the dielectric layer parallel to the longitudinal direction of the fibrous conductive cores, a thermal stress may be applied due to the difference in thermal expansion coefficient between the conductive polymer layer and the dielectric layer, and a crack may occur in the dielectric layer.)

Thereafter, the second conductive portion 15 is formed in contact with the top portion 13b of the conductive polymer layer 13. The second conductive portion 15 may be formed of a conductive paste as described above. The second conductive portion 13 may be formed by applying the conductive paste across the top portion 13b of the conductive polymer layer 13. Since the conductive paste has relatively high viscosity and is unlikely to enter the gaps G, the gaps G can be maintained. The method of applying the conductive paste is not particularly limited, and may be, for example, a method using a blade, a coater, or the like, and post-treatment such as drying or heating may be appropriately performed.

Finally, the resin layer 17 is formed on the second conductive portion 15. As described above, the resin layer 17 may be formed of any appropriate resin material. As a method of forming the resin layer 17, a known resin sealing method such as potting may be used.

As described above, the capacitor 20 of the present embodiment can be manufactured, but the manufacturing method is not limited thereto.

The capacitor 20 of the present embodiment has a conductor-dielectric-conductor structure with the fibrous conductive cores 9, the dielectric layer 11, and the conductive polymer layer 13. The fibrous conductive cores 9 and the conductive polymer layer 13 are not in direct contact with each other, and are opposed to each other with the dielectric layer 11 interposed therebetween. In the capacitor 20 of the present embodiment, the fibrous conductive cores 9 and the conductive polymer layer 13 are each electrically connected to the outside in any appropriate aspect. More specifically, contact can be made from the fibrous conductive cores 9 via the first conductive portion 3 (and, if applicable, the substrate 1, e.g. the main surface (back surface) 1b). On the other hand, contact can be made from the conductive polymer layer 13 via the second conductive portion 15.

Figure 2:
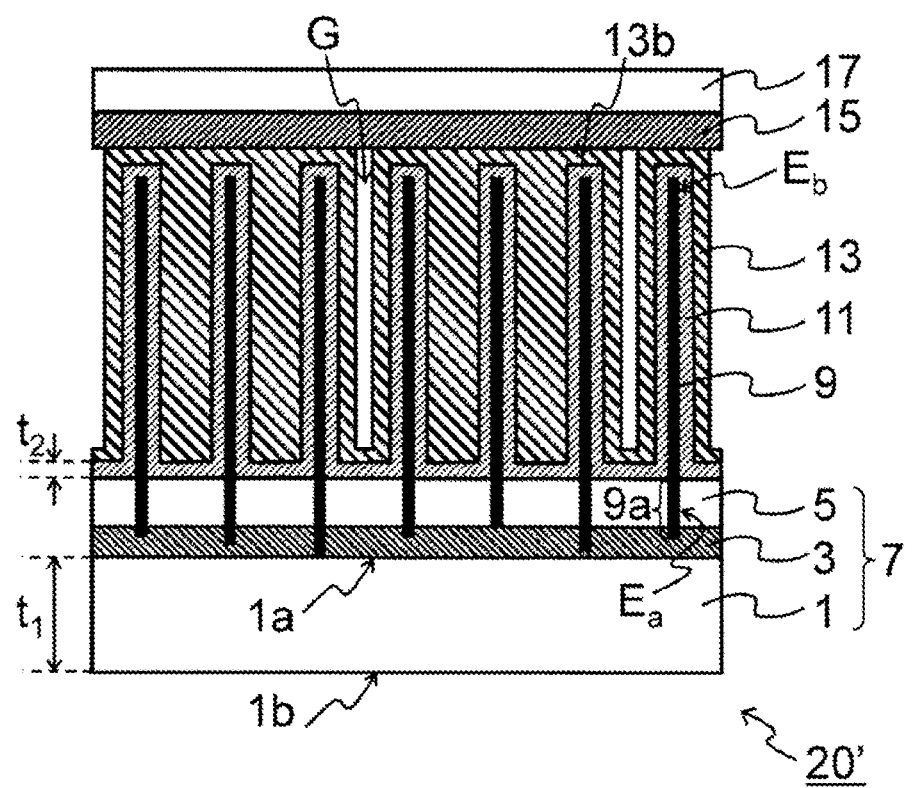
FIG. 2 shows a schematic sectional view of another exemplary capacitor according to one embodiment of the present invention.
Figure 3:
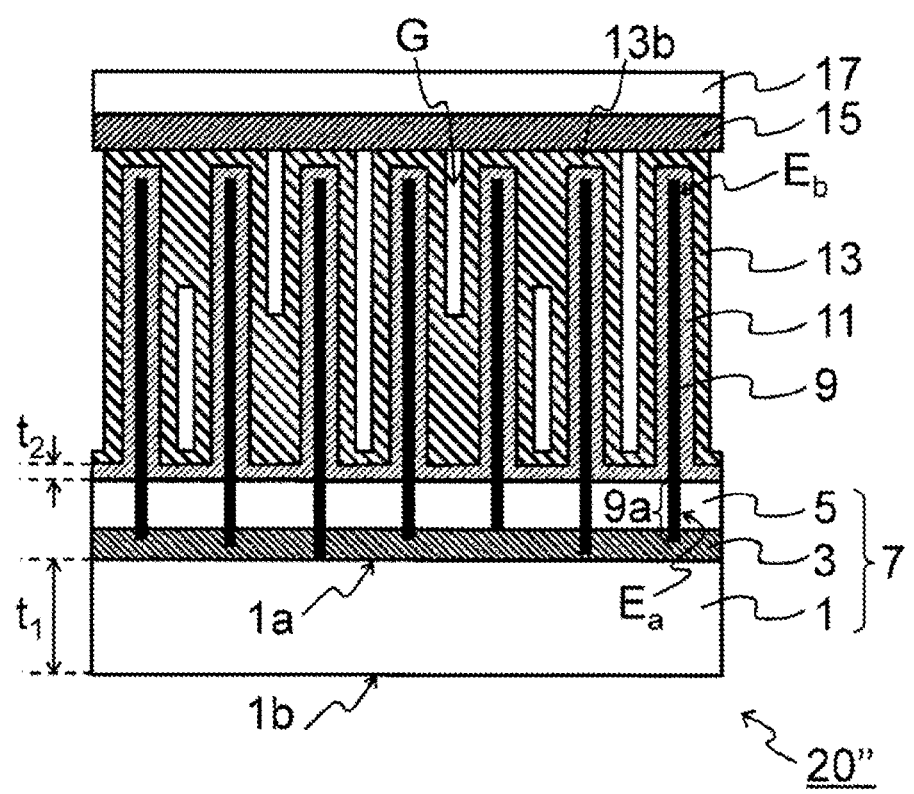
FIG. 3 shows a schematic sectional view of yet another exemplary capacitor according to one embodiment of the present invention.

Various modifications can be made to the capacitor 20 of the present embodiment without departing from the scope of the present invention. In the capacitor 20 exemplarily illustrated in FIG. 1, the gaps G are illustrated as corresponding to all the spaces among the plurality of the fibrous conductive cores 9, but the gaps G may not necessarily correspond to all the spaces among the fibrous conductive cores 9. For example, as in a capacitor 20' exemplarily illustrated in FIG. 2 and a capacitor 20" exemplarily illustrated in FIG. 3, some and/or a part of the spaces among the plurality of the fibrous conductive cores 9 may be filled with the conductive polymer layer 13.

Second Embodiment

The present embodiment relates to an aspect in which a plurality of fibrous conductive cores are not necessarily aligned perpendicular to a base material. Unless otherwise specified in the present embodiment, the description in the first embodiment can also be applied to the present embodiment.

Figure 4:
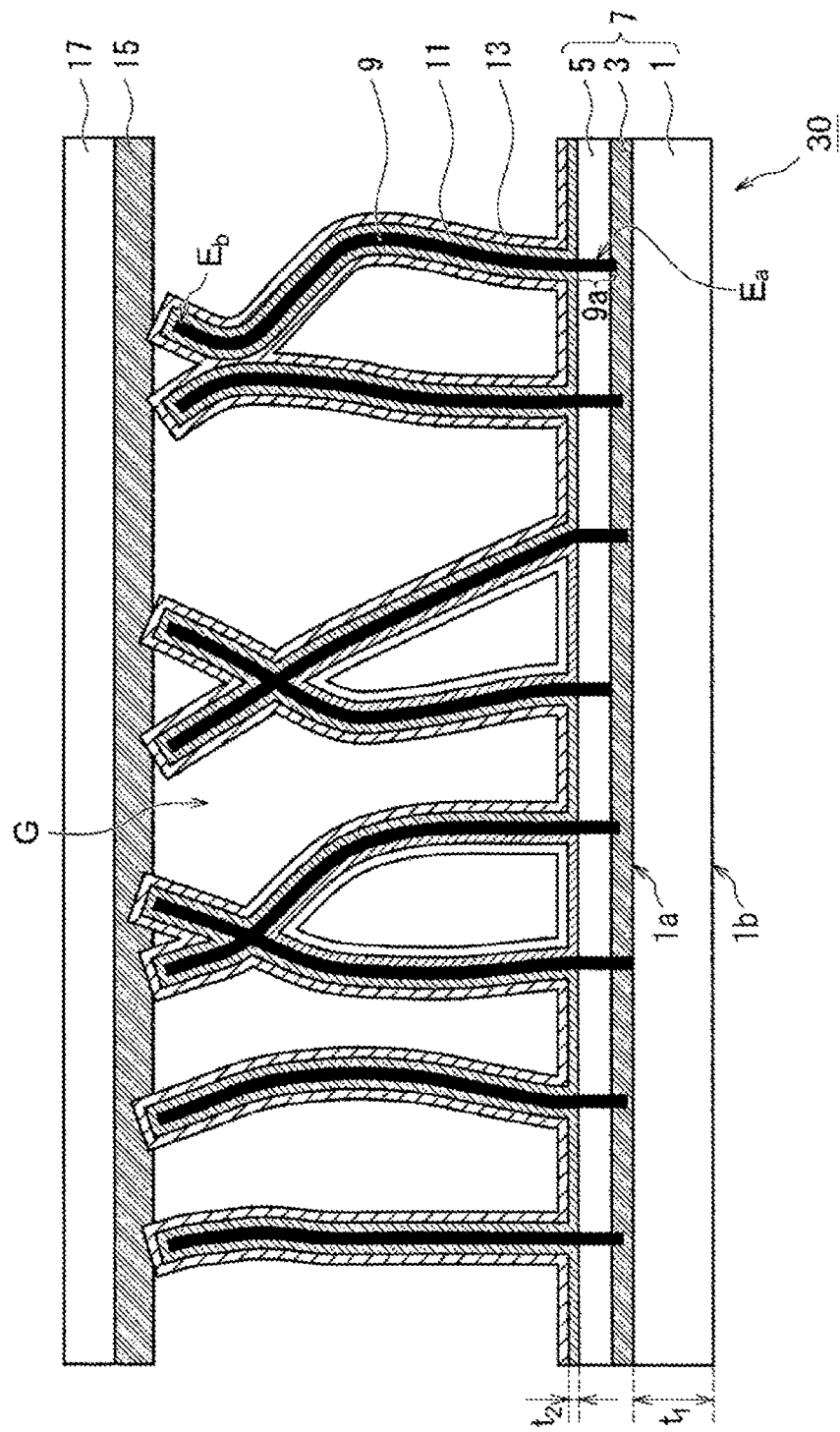
FIG. 4 shows a schematic sectional view of a capacitor according to another embodiment of the present invention.

Referring to FIG. 4, in a capacitor 30 of the present embodiment, the plurality of the fibrous conductive cores 9 include the fibrous conductive cores that are not aligned perpendicularly to the base material 7. For example, among the plurality of the fibrous conductive cores 9, at least a part of the fibrous conductive cores 9 may not be straight in a portion exposed from the base material 7 (a portion excluding the base material-embedded portion 9a), and may be curved, bent, and/or inclined, for example. In addition, for example, any two or more fibrous conductive cores 9 among the plurality of the fibrous conductive cores 9 may be in contact with (or intersect with) each other in the portion exposed from the base material 7 (the portion excluding the base material-embedded portion 9a). The height of the other end portion $E_b$ of each of the plurality of the fibrous conductive cores 9 (for example, the height from the front surface of the base material 7) may be substantially uniform or may be non-uniform (not uniform).

Also in the present embodiment, the portion of the plurality of the fibrous conductive cores 9 exposed from the base material 7 and the surface region of the base material 7 where the plurality of the fibrous conductive cores 9 are exposed are covered with the dielectric layer 11, and the dielectric layer 11 is covered with the conductive polymer layer 13. For example, as described above, when any two or more fibrous conductive cores 9 among the plurality of the fibrous conductive cores 9 are in contact with (or intersect with) each other in the portion exposed from the base material 7 (the portion excluding the base material-embedded portion 9a), the dielectric layer 11 and the conductive polymer layer 13 are formed around the contact point of the two or more fibrous conductive cores 9 at the contact point and in the vicinity thereof.

Also in the present embodiment, the conductor-dielectric-conductor structure (corresponding to the so-called MIM structure) is formed of the plurality of the fibrous conductive cores 9, the dielectric layer 11, and the conductive polymer layer 13, and the capacitor 30 of the present embodiment can operate as a capacitor.

The characteristics of the present embodiment have been exemplarily described with reference to FIG. 4 as a modification of the first embodiment described above with reference to FIG. 1, and the characteristics of the present embodiment may also be combined with the modifications of the first embodiment described above with reference to FIGS. 2 and 3.

The capacitor of the present invention may be utilized in any appropriate application, and may be suitably utilized, for example, when a thermal stress may be applied during use by a user.

DESCRIPTION OF REFERENCE SYMBOLS

1: Substrate
1a: Main surface (front surface)
1b: Main surface (back surface)
3: First conductive portion
5: Insulating-resin layer
7: Base material
9: Plurality of fibrous conductive cores
9a: Base material-embedded portion
11: Dielectric layer
13: Conductive polymer layer
13b: Top portion
15: Second conductive portion
17: Resin layer
20, 20', 20", 30: Capacitor
G: Gap
$E_a$, $E_b$: End portion
$t_1$, $t_2$: Thickness

The invention claimed is:

1. A capacitor comprising:
 a base material having:
  a substrate;
  a first conductive portion on at least one main surface of the substrate; and
  an insulating-resin layer on a surface of the first conductive portion opposite to the substrate;
 a plurality of fibrous conductive cores, a first end portion of each of the plurality of the fibrous conductive cores being in contact with the first conductive portion through the insulating-resin layer and a second end portion of each of the plurality of the fibrous conductive cores being exposed from the base material;
 a dielectric layer covering a portion of the plurality of the fibrous conductive cores exposed from the base material and a surface region of the base material where the plurality of the fibrous conductive cores are exposed;
 a conductive polymer layer covering the dielectric layer such that gaps are provided in spaces between at least some of the plurality of the fibrous conductive cores; and
 a second conductive portion arranged in contact with the conductive polymer layer at the second end portion of each of the plurality of the fibrous conductive cores.

2. The capacitor according to claim 1, wherein the insulating-resin layer contains a thermoplastic resin.

3. The capacitor according to claim 1, wherein an absolute value of a difference in a linear expansion coefficient between the dielectric layer and the substrate is $1\times10^{-7}$/K or more, a Young's modulus of the substrate is 10 GPa or more, and a ratio of a thickness of the substrate to a thickness of the dielectric layer is 100 or more.

4. The capacitor according to claim 1, wherein the dielectric layer is composed of at least one selected from a group consisting of aluminum oxide, silicon oxide, barium titanate, silicon nitride, and hafnium oxide.

5. The capacitor according to claim 1, wherein the substrate is composed of at least one selected from a group consisting of silicon, copper, aluminum, and nickel.

6. The capacitor according to claim 1, wherein each of the plurality of the fibrous conductive cores is a conductive nanotube or a conductive nanorod.

7. The capacitor according to claim 1, wherein each of the plurality of the fibrous conductive cores is a carbon nanotube.

8. The capacitor according to claim 1, wherein the plurality of fibrous conductive cores are aligned such that a longitudinal direction thereof is perpendicular to the base material.

9. The capacitor according to claim 1, wherein a thickness of the first conductive portion is smaller than a thickness of the substrate.

10. The capacitor according to claim 1, wherein a thickness of the insulating-resin layer is 1 μm to 100 μm.

11. The capacitor according to claim 1, wherein the conductive polymer layer covers the dielectric layer such that the gaps are provided in the spaces between all of the plurality of the fibrous conductive cores.

12. The capacitor according to claim 1, wherein at least a part of the plurality of fibrous conductive cores are not aligned perpendicularly to the base material.

* * * * *